US012801663B2

(12) United States Patent
McCarson

(10) Patent No.: US 12,801,663 B2
(45) Date of Patent: Nov. 17, 2026

(54) AGENT-ENHANCED CONTEXT AWARE AI DATABASE (CAAD) SYSTEM AND FRAMEWORK FOR INTELLIGENT CONTEXT OPERATIONS, ITERATIVE REASONING, AND ARTIFICIAL GENERAL INTELLIGENCE (AGI)

(71) Applicant: AIECONOMY LLC, Tempe, AZ (US)

(72) Inventor: Brian McCarson, Chandler, AZ (US)

(73) Assignee: AIECONOMY LLC, Tempe, AZ (US)

( * ) Notice: Subject to any disclaimer, the term of this patent is extended or adjusted under 35 U.S.C. 154(b) by 0 days.

(21) Appl. No.: 19/301,060

(22) Filed: Aug. 15, 2025

(65) Prior Publication Data

US 2025/0371074 A1 Dec. 4, 2025

Related U.S. Application Data

(63) Continuation-in-part of application No. 17/840,390, filed on Jun. 14, 2022, now abandoned, which is a (Continued)

(51) Int. Cl.

*G06F 18/20* (2023.01)
*G06F 16/587* (2019.01)

(Continued)

(52) U.S. Cl.

CPC .......... *G06F 16/587* (2019.01); *G06F 16/907* (2019.01); *G06F 18/2133* (2023.01);

(Continued)

(58) Field of Classification Search

CPC .. G06F 16/587; G06F 16/907; G06F 18/2133; G06F 18/29; G06F 18/24155;

(Continued)

(56) References Cited

U.S. PATENT DOCUMENTS

| | | | |
|---|---|---|---|
| 7,000,357 | B1 | 2/2006 | Stearns et al. |
| 8,379,913 | B1 | 2/2013 | Robinson et al. |

(Continued)

FOREIGN PATENT DOCUMENTS

| | | | |
|---|---|---|---|
| WO | 2025006538 | A1 | 1/2025 |
| WO | 2025212965 | | 10/2025 |
| WO | 2025212965 | A1 | 10/2025 |

OTHER PUBLICATIONS

Mondal, Rajdeep, et al. "Multi-agent AI System for High Quality Metadata Curation at Scale." bioRxiv (Jun. 2025): Jun. 2025. (Year: 2025).*

(Continued)

*Primary Examiner* — Randall K. Baldwin
(74) *Attorney, Agent, or Firm* — Daniel R. Pote

(57) ABSTRACT

A context-aware AI database (CAAD) integrated with modular, hierarchically organized and collaborative, goal-driven context agents that perform specific cognitive functions such as sentiment analysis, priority ranking, and feature extraction through standardized APIs. The system generates and manages multiple types of metadata: data-associated metadata (source attributions, embeddings, statistical features, timestamps) and model-associated metadata (model provenance, analysis conditions and parameters, performance scores, methodological details), using agentic AI approaches to improve data accuracy, experimental transparency, traceability, reproducibility, contextual explainability in both training and inference operations. The architecture enables automated context refinement and includes innovative "pointers" and "deep pointers" that link analytical insights directly to source data and sub-features, enabling interpretable and auditable iterative reasoning. Furthermore, the architecture support a probationary context capability for experimental knowledge, memory decay logic for dynamic and configurable forgetting, as well as a hier- (Continued)

archical context layering to manage global, task specific, or otherwise ephemeral knowledge collection.

20 Claims, 4 Drawing Sheets

Related U.S. Application Data continuation of application No. 16/797,640, filed on Feb. 21, 2020, now Pat. No. 11,361,202.

(51) Int. Cl.

| | |
|---|---|
| ***G06F 16/907*** | (2019.01) |
| ***G06F 18/2133*** | (2023.01) |
| ***G06F 18/2415*** | (2023.01) |
| ***G06N 3/08*** | (2023.01) |
| ***G06N 7/01*** | (2023.01) |
| ***G06V 10/764*** | (2022.01) |
| ***G06V 10/84*** | (2022.01) |
| ***G06V 20/10*** | (2022.01) |
| ***G06V 20/13*** | (2022.01) |
| ***G08G 1/01*** | (2006.01) |
| ***G08G 3/00*** | (2006.01) |
| ***G08G 5/20*** | (2025.01) |

(52) U.S. Cl.

CPC ........ *G06F 18/24155* (2023.01); *G06F 18/29* (2023.01); *G06N 3/08* (2013.01); *G06N 7/01* (2023.01); *G06V 10/764* (2022.01); *G06V 10/84* (2022.01); *G06V 20/13* (2022.01); *G06V 20/188* (2022.01); *G08G 1/0133* (2013.01); *G08G 3/00* (2013.01); *G08G 5/20* (2025.01)

(58) Field of Classification Search

CPC .... G06V 10/84; G06V 10/764; G06V 20/188; G06V 20/13; G06N 7/01; G06N 3/08; G08G 5/20; G08G 1/0133; G08G 3/00

See application file for complete search history.

(56) References Cited

U.S. PATENT DOCUMENTS

| | | | | |
|---|---|---|---|---|
| 11,361,202 | B2 | 6/2022 | McCarson | |
| 12,086,178 | B2 | 9/2024 | McCarson | |
| 12,088,599 | B1 | 9/2024 | McCarson | |
| 12,450,284 | B2 | 10/2025 | McCarson | |
| 2008/0162182 | A1 | 7/2008 | Cazares et al. | |
| 2013/0024125 | A1 | 1/2013 | Lystig et al. | |
| 2017/0041874 | A1 | 2/2017 | Jarosinski et al. | |
| 2017/0369162 | A1 | 12/2017 | Alzahrani | |
| 2018/0137454 | A1 | 5/2018 | Kulkarni et al. | |
| 2018/0198831 | A1 | 7/2018 | Calcaterra et al. | |
| 2019/0147305 | A1 | 5/2019 | Lu et al. | |
| 2019/0332863 | A1 | 10/2019 | Abhishek et al. | |
| 2020/0299988 | A1 | 9/2020 | Newman | |
| 2021/0264225 | A1 | 8/2021 | McCarson | |
| 2022/0318577 | A1 | 10/2022 | McCarson | |
| 2023/0289381 | A1 | 9/2023 | McCarson | |
| 2023/0342392 | A1 | 10/2023 | McCarson | |
| 2024/0256598 | A1 | 8/2024 | McCarson | |
| 2024/0265047 | A1 | 8/2024 | McCarson | |
| 2024/0346342 | A1* | 10/2024 | Lewis | G06N 3/044 |
| 2024/0419706 | A1* | 12/2024 | Gutierrez | G06F 40/166 |
| 2025/0061377 | A1* | 2/2025 | Ngo | G06N 20/10 |
| 2025/0190460 | A1* | 6/2025 | Madisetti | G06F 16/3329 |
| 2025/0200108 | A1 | 6/2025 | McCarson | |
| 2025/0200208 | A1* | 6/2025 | Roper, Jr | G06F 16/93 |
| 2025/0244964 | A1* | 7/2025 | Mystetskyi | G06F 8/65 |
| 2025/0258774 | A1* | 8/2025 | Sun | G06N 3/084 |
| 2025/0259043 | A1* | 8/2025 | Crabtree | G06N 3/042 |
| 2025/0278526 | A1* | 9/2025 | Roper, Jr | G06F 30/15 |
| 2025/0371074 | A1 | 12/2025 | McCarson | |
| 2026/0037573 | A1 | 2/2026 | McCarson | |

OTHER PUBLICATIONS

Maragheh, Reza Yousefi, and Yashar Deldjoo. "The Future is Agentic: Definitions, Perspectives, and Open Challenges of Multi-Agent Recommender Systems." arXiv preprint arXiv:2507.02097 v2 (Jul. 2025). (Year: 2025).*

Cui, Weixiong, et al. "A Review of Automated Data Science Based on Large Language Models." 2025 21st International Conference on Natural Computation, Fuzzy Systems and Knowledge Discovery (ICNC-FSKD). IEEE, Jul. 2025. (Year: 2025).*

Tang, Jiabin, et al. "AI-Researcher: Autonomous Scientific Innovation." arXiv e-prints (May 2025): arXiv-2505. (Year: 2025).*

Bousetouane, Fouad. "Agentic systems: A guide to transforming industries with vertical ai agents." arXiv preprint arXiv:2501.00881 (Jan. 2025). (Year: 2025).*

Arslanalp et al. ("Big Data on Vessel Traffic: Nowcasting Trade Flows in Real Time: IMP Working paper", WP/19/275, Dec 13, 2019, pp. 1-34) (Year: 2019).

Ayush et al. ("Generating Interpretable Poverty Maps using Object Detection in Satellite Images", https://arxiv.org/pdf/2002.01612v1.pdf, arXiv:202.01612v1 [cs.CV], Feb. 5, 2020, pp. 1-9) (Year: 2020).

Blazquez et al. ("Big Data sources and methods for social and economic analyses", Technological Forecasting and Social Change 130, 2018, pp. 99-113) (Year: 2016).

Cong et al. ("Alternative Data for FinTech and Business Intelligence", Available at SSRN: https://ssrn.com/abstract=3521349 or http://dx.doi.org/10.2139/ssrn.3521349, Oct. 1, 2019, p. 1-31) (Year: 2019) entire document.

Dandala et al. ("Internet of Vehicles (IoV) for Traffic Management", IEEE International Conference on Computer, Communication and Signal Processing (ICCCSP-2017), 2017, pp. 1-4) (Year: 2017).

Fedorov et al. ("Traffic flow estimation with data from a video surveillance camera", Journal Big Data, 6:73, 2019, pp. 1-15) (Year: 2019).

Hu et al. ("Improved monitoring of urbanization processes in China for regional climate impact assessment", Environ Earth Sci 73, pp. 8387-8404, 2015) (Year: 2015).

Joseph et al. ("A novel vessel detection and classification algorithm using deep learning neural network model with morphological processing (M-DLNN)", Soft Computing 23, 2019, pp. 2693-2700) (Year: 2019).

Kolanovic et al. ("Big Data and AI Strategies: Machine Learning and Alternative Data Approach to Investing", JP Morgan, Global Quantitative and Derivatives Strategy, May 18, 2017, pp. 1-280) (Year: 2017).

Li et al. ("Estimation of regional economic development indicator from transportation network analytics", Scientific reports, 10(1), Feb. 14, 2020, pp. 1-15) (Year: 2020).

Lopez-Lozano et al. ("An evaluation framework to build a cost-efficient crop monitoring system. Experiences from the extension of the European crop monitoring system," Agricultural Systems 168, 302, pp. 231-246) (Year: 2019) entire document.

Nakajima et al. ("Bayesian Analysis of Latent Threshold Dynamic Models", 2011 Seminar on Bayesian Inference in Econometrics and Statistic (SBIES), 2011 pp. 1-36) (Year: 2011).

Radford et al. ("Language Models are Unsupervised Multitask Learners", OpenAI blog, 1(8), 2019, pp. 1-24) (Year: 2019) entire document.

Saeed et al. ("Forecasting wheat yield from weather data and MODIS NDVI using Random Forests for Punjab province, Pakistan", International Journal of Remote Sensing, 38:17, 2017, pp. 4831-4854) (Year: 2017).

Search Report and Written Opinion of the ISA, Issued Aug. 29, 2024 in PCT/US2024/035527.

Suraj et al. ("On monitoring development indicators using high resolution satellite images", https://arxiv.org/abs/1712.022822, arXiv: 1712.02282v3 [econ. EM] Jun. 25, 2018, pp. 1-36) (Year: 2018).

(56) References Cited

OTHER PUBLICATIONS

Atkinson-Abutridy, John, Chris Mellish, and Stuart Aitken. “A semantically guided and domain-independent evolutionary model for knowledge discovery from texts.” IEEE Transactions on Evolutionary Computation 7.6 (2004): 546-560. (Year: 2004).
Bazgir, Adib, and Yuwen Zhang. “Agentichypothesis: A survey on hypothesis generation using llm systems.” Towards Agentic AI for Science: Hypothesis Generation, Comprehension, Quantification, and Validation (Mar. 2025). (Year: 2025).
Huang, Lifu, et al. “Towards Agentic AI for Science: Hypothesis Generation, Comprehension, Quantification, and Validation.” Companion Proceedings of the ACM on Web Conference May 2025. (Year: 2025).
Queralt-Rosinach, NA°ria, et al. “Structured reviews for data and knowledge-driven research.” Database 2020 (2020): baaa015. (Year: 2020).
Silva, Kelson, et al. “Arch Hypo: managing software architecture uncertainty using hypotheses engineering.” IEEE Transactions on Software Engineering (2024). (Year: 2024).
Singh, Hardial. “How Generative AI is Revolutionizing Scientific Research by Automating Hypothesis Generation.” Available at SSRN 5267912 (Jul. 2025). (Year: 2025).

* cited by examiner

153

AGENT-ENHANCED CONTEXT AWARE AI DATABASE (CAAD) SYSTEM AND FRAMEWORK FOR INTELLIGENT CONTEXT OPERATIONS, ITERATIVE REASONING, AND ARTIFICIAL GENERAL INTELLIGENCE (AGI)

CROSS-REFERENCE TO RELATED APPLICATIONS

The present application is a Continuation-in-Part of U.S. Ser. No. 17/840,390, published as U.S. Pat. Pub. No. 2022/0318577, filed Jun. 14, 2022 entitled "Systems and Methods for Deriving Leading Indicators of Economic Activity Using Predictive Analytics," which is a Continuation of U.S. Ser. No. 16/797,640, filed Feb. 21, 2020, now U.S. Pat. No. 11,361,202 issued Jun. 14, 2022 and entitled "Systems and Methods For Deriving Leading Indicators of Future Manufacturing, Production, and Consumption of Goods and Services," the entire contents of which are hereby incorporated by reference.

TECHNICAL FIELD

The present subject matter relates, generally, to artificial intelligence systems and databases, and, more particularly, to an extensible, agent-enhanced context-aware AI database system for managing, transforming, and embedding structured and unstructured data enriched with contextual intelligence.

BACKGROUND

Recent years have seen dramatic advances in the use of artificial intelligence (AI) systems, particularly agentic large language model (LLM) systems. Despite such advances, the database paradigms currently employed by such systems are unsatisfactory in a number of respects. For example, while traditional databases serve as repositories for structured or semi-structured data, these databases are typically agnostic to semantic, analytic, retrieval, processing or other experimental context.

In contrast, evolving enterprise AI use-cases demand intelligent agents capable of operating on contextual data, performing augmentation, normalization, classification, and meta-analytics in an orchestrated and modular fashion. The field of retrieval-augmented generation (RAG) requires contextual synergy to achieve optimal results and thus, a context-awareness in databased can drive significant efficiency gains and improved model performance. Furthermore, these tasks also extend beyond data into metadata concerning models, analyses, and hypotheses, all foundational capabilities for iterative reasoning capabilities which are required for achieving superintelligence or artificial general intelligence (AGI).

Thus, there is a long-felt need for more advanced database systems that can extend the capabilities of intelligent agents and address these and other limitations of the prior art.

BRIEF SUMMARY

Embodiments of the present invention relate to a context-aware AI database (CAAD) integrated with a modular framework of context agents. The context agents interact with the CAAD via standardized APIs or an internal databus to read, process, and write back contextual data and embeddings. Each agent is configured to perform a specific cognitive or data-transformation function, such as time normalization, sentiment classification, or machine learning feature extraction. CAAD can be used independently, or as a plug-in for 3rd party LLMs, APIs, orchestrators, iterative reasoning systems, iterative learning systems, Hypothesis Generation and Testing Systems (HGTS) and the like.

The present subject matter contemplates the treatment and generation of multiple classes of metadata: (1) metadata associated with data/information (e.g., source attribution, embeddings, statistical features, timestamps, agent outputs) and (2) metadata associated with models, hypotheses, and analytical procedures (e.g., model provenance, analysis conditions, heuristics, R2 scores, performance to objective scores object detection models used, and feature selection rationale).

Agentic AI approaches are employed both to improve the accuracy of the stored and interpreted data and to enhance the fidelity and transparency of experimental processes by generating, contextualizing, and documenting metadata associated with models and experiments.

The resulting agent-enhanced architecture enables automated context refinement, continuous enrichment, and fine-grained control over how data is semantically interpreted and operationalized by AI systems. An additional innovation includes the concept of AI-related "pointers" and "deep pointers," contextual references linking analytical insight to source data and models. These enable direct access to sub-features within datasets (e.g., bounding boxes in image frames) and metadata descriptors defining the models and methods used to derive them. The present subject matter provides persistent and structured memory architecture for autonomous or semi-autonomous AI systems, enabling retention, ranking, and contextual utilization and understanding of historical knowledge, experiential and experimental metadata, as well as agent or human interaction data.

Systems and methods in accordance with the present invention form a reusable, extensible foundation for AGI by enabling recursive analysis, reproducibility, and fully interpretable context-aware model development pipelines.

BRIEF DESCRIPTION OF THE DRAWING FIGURES

The present invention will hereinafter be described in conjunction with the appended drawing figures, wherein like numerals denote like elements, and:

DETAILED DESCRIPTION

The present disclosure relates to a context-aware AI database (CAAD) integrated with a modular framework of context agents. This agent-enhanced functionality assists in managing and enriching data and model metadata. The agents are used, for example, to normalize, classify, cleanse, and analyze context. Metadata includes raw and formatted information about both data and models, such as statistical features, object detection parameters, agent outputs, and experimental heuristics. CAAD functions as an artificial memory architecture for LLMs and autonomous agents, mimicking human-like episodic and semantic memory. This enables persistent recall of contextualized knowledge across sessions, tasks, or workflows, extending beyond the transient memory scope of traditional LLMs. The disclosed database architecture supports reproducibility and semantic transparency in both AI models and data workflows and serves as a foundation for artificial general intelligence (AGI).

Figure 1:
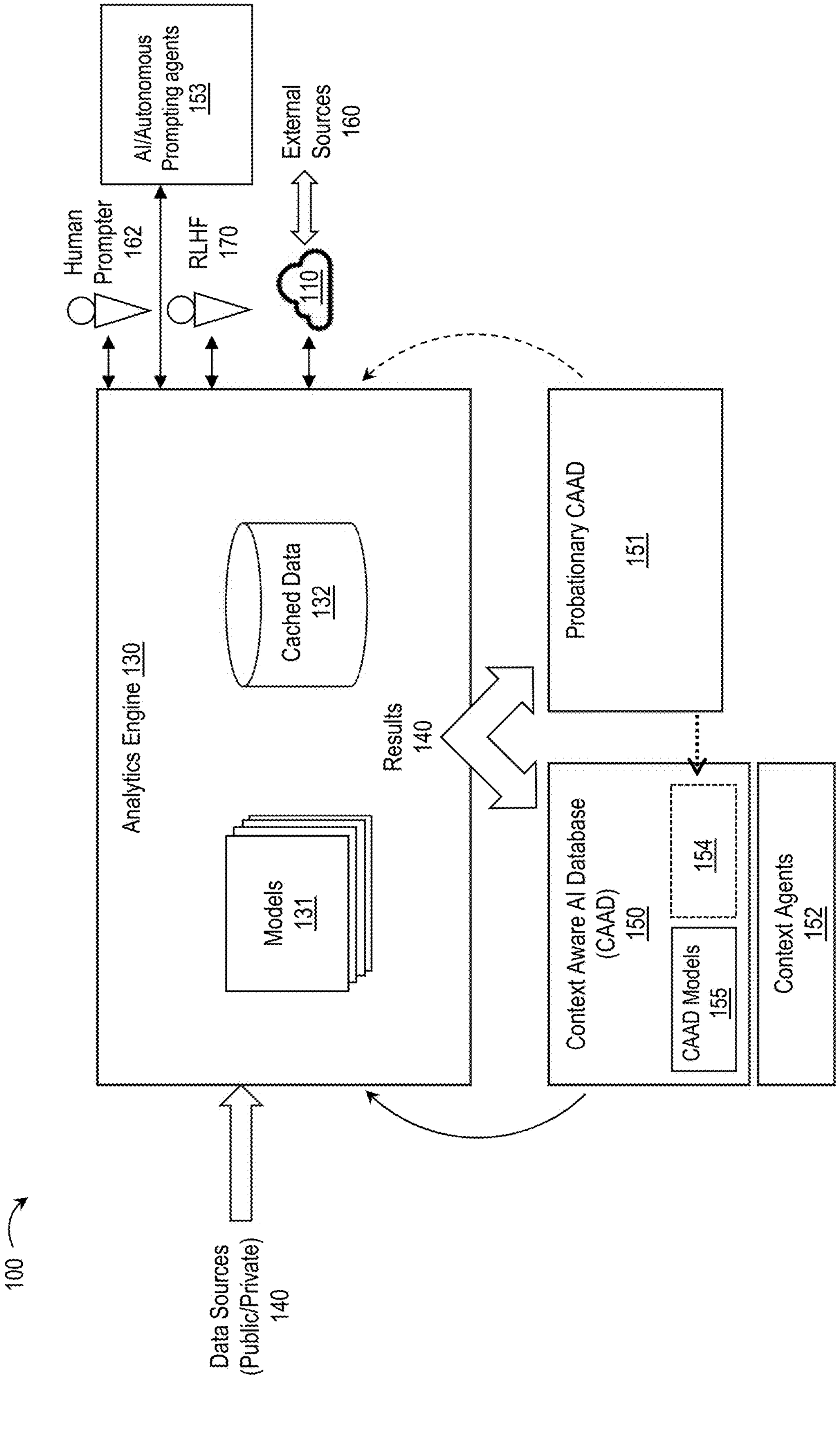
FIG. 1 is a conceptual block diagram of a hypothesis generation and testing system (HGTS) useful in describing the present invention.

Referring first to the conceptual block diagram of FIG. 1, the present invention, which relates to a novel database architecture in combination with modern AI techniques, may be illustrated in the context of a hypothesis generation and testing system (HGTS) 100. As illustrated, HGTS 100 generally includes an analytics engine 130 configured to receive various data sources 140, which may be public, private, or a combination thereof. Analytics engine 130 includes a number of models (e.g., previously trained machine learning models) 131 and may include cached data 132 or in other embodiments may use data cached in CAAD or other databases. In general, analytics engine 130 is configured to form its own hypotheses and subsequently test that hypothesis on cached data 132 and/or data sources 140 and external source 160 available over a network 110.

More particularly, analytics engine 130 is configured to generate a hypothesis object comprising at least a set of independent variables, a dependent variable (or variables), a machine learning model (i.e., a type of model within models 131), and metadata associated therewith. CAAD 150 may further include its own CAAD models 155, as illustrated.

This hypothesis object and its associated data structure may be stored in any convenient manner known in the art (e.g., as a JSON file, data object, etc.). Thus, engine 130 is capable of performing its own planned experiments. The experimental results and conclusions of its experiments (e.g., correlation coefficients, analysis of variance, figures-of-merit, etc.) are stored along with the hypothesis object itself in a metadata format so that ongoing trends in model accuracy can be observed and utilized to further improve both model/algorithm accuracy as well as the hypothesis generating and testing system.

Upon conclusion of an experiment, the result(s) (140) inform how the experiment is treated. Specifically, if there is a statistically significant correlation-either positive or negative (i.e., countercyclical or procyclical)—the metadata, model, cause-effect or structured event sequences, and data for that experiment are stored in context-aware artificial intelligence database (CAAD) 150. If there is a non-existent correlation (i.e., acyclical), the entire experiment may be discarded or alternatively may be stored as a null hypothesis if that improves iterative reasoning performance for future hypotheses or theory discovery. If, however, the determined correlation and/or its statistical significance are borderline or otherwise weak, then that experiment may be stored within probationary database 151 for further correlations refinement with additional hypotheses to be tested when additional computation cycles or when additional data become available. In an alternative embodiment, rather than storing experimental results in a logically separate probationary database 151, a flag system (154) is used within CAAD 150 to indicate that the particular results are probationary. This flag may be binary or may be a numerical value indicating significance. Promotion of data from probationary status either in database form or as a flag can be performed either by human in the loop (HITL), human in the middle (HITM), semi-autonomous rules engine based, or via fully autonomous determination. This mechanism emulates how human cognition remains tentative or speculative ideas without prematurely discarding them. Thus, such a probationary architecture permits AI systems to incubate weakly-supported preliminary ideas or hypotheses and allow iterative reasoning or iterative logic methods to be used to promote them once a threshold has been surpassed. Alternatively, null hypothesis can be stored permanently if that improves iterative reasoning capability by avoiding resource demands of repeatedly failed experiments. Furthermore, decay agents can be used in some embodiments to enable deprioritization of poorly supported hypotheses over time if multiple iterations yield no improvement in correlative results or invalidated context, detected inaccuracies, recency information and the like, similar to human forgetting which can both help focus systems and can drive resource efficiency.

Also illustrated in FIG. 1 is a reinforcement learning from human feedback (RLHF) system 170, which is a mechanism by which reinforcement learning can be provided to one or more models 131 (and/or 155). That is, as is known in the art, human feedback may be provided to "align" the output of a model (e.g., an LLM used by any of the modules illustrated in FIG. 1) to human preferences. Such RLHF 170 procedures may be used to improve performance, optimization of prompts, and overall training accuracy. However, reinforcement learning (RL) can also be semi-autonomous rules engine based, or fully autonomous determination.

As described further detail below, hypotheses may be generated and tested by analytics engine 130 autonomously or through prompts provided by a human (e.g., human prompter 162) or various AI-based or autonomous prompting agents 153. Thus, HGTS 100 can be viewed as a generative AI system or a form of superintelligence, general artificial intelligence operating in the field of scientific research. Further information regarding HGTS 100 may be found in U.S. Pat. No. 11,093,311, entitled "Generative AI Systems and Methods for Economic Analytics and Forecasting," and 11,361,202, entitled "Systems and Methods for Deriving Leading Indicators of Future Manufacturing, Production, and Consumption of Goods and Services," the entire contents of which are hereby incorporated by reference.

Figure 2:
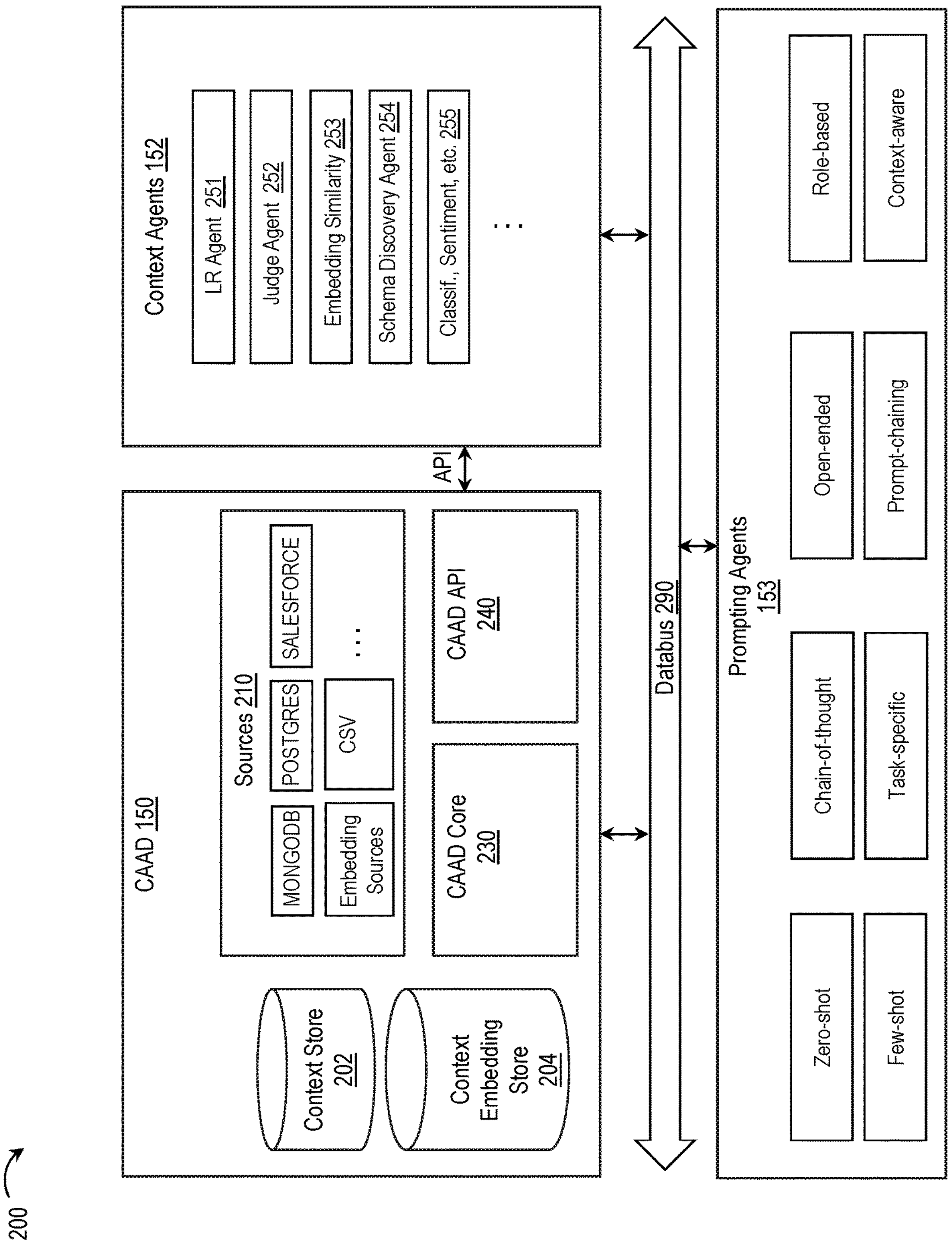
FIG. 2 is a conceptual block diagram illustrating operation of a context-aware database in accordance with various embodiments.

FIG. 2 is a conceptual block diagram illustrating, in more detail, operation of CAAD 150 in accordance with various embodiments. More particularly, system 200 includes CAAD 150, a collection of context agents 152, prompting agents 153, all of which communicate via a databus 290 and/or one or more APIs. CAAD 150 includes a context store 202, a context embedding store 204, a variety of source 210, a CAAD core 230, and a CAAD API 240.

Context agents 152 include a variety of AI agents, as that term is understood in the art, such as LR agents 251, judge agents 252, embedding similarity agents 253, schema discovery agents 254, classification/sentiment agents 255, and any other agentic entity now known or later developed. In some embodiments, the CAAD includes a context scoring module, configured to assign relevance weights to context entries based on temporal decay, accuracy, usage frequency, reinforcement learning feedback, statistical confidence, relevance to belief states, goals, policies, or objectives, or user-defined prioritization schemas. Belief states, goals, policies, or objectives can be diverse to simulate contrasting perspectives, thus enhancing reasoning diversity and completeness of global perspectives.

Prompting agents 153 include one or more agents configured to generate prompts to be used by context agents 151 and/or CAAD 150. Thus, for example, prompting agents 153 may include zero-shot agents, few-shot agents, chain-of-thought agents, task-specific agents, open-ended prompt agents, prompt-chaining agents, role-based agents, context-aware agents, and any other category of agents now known or later developed.

Figure 3:
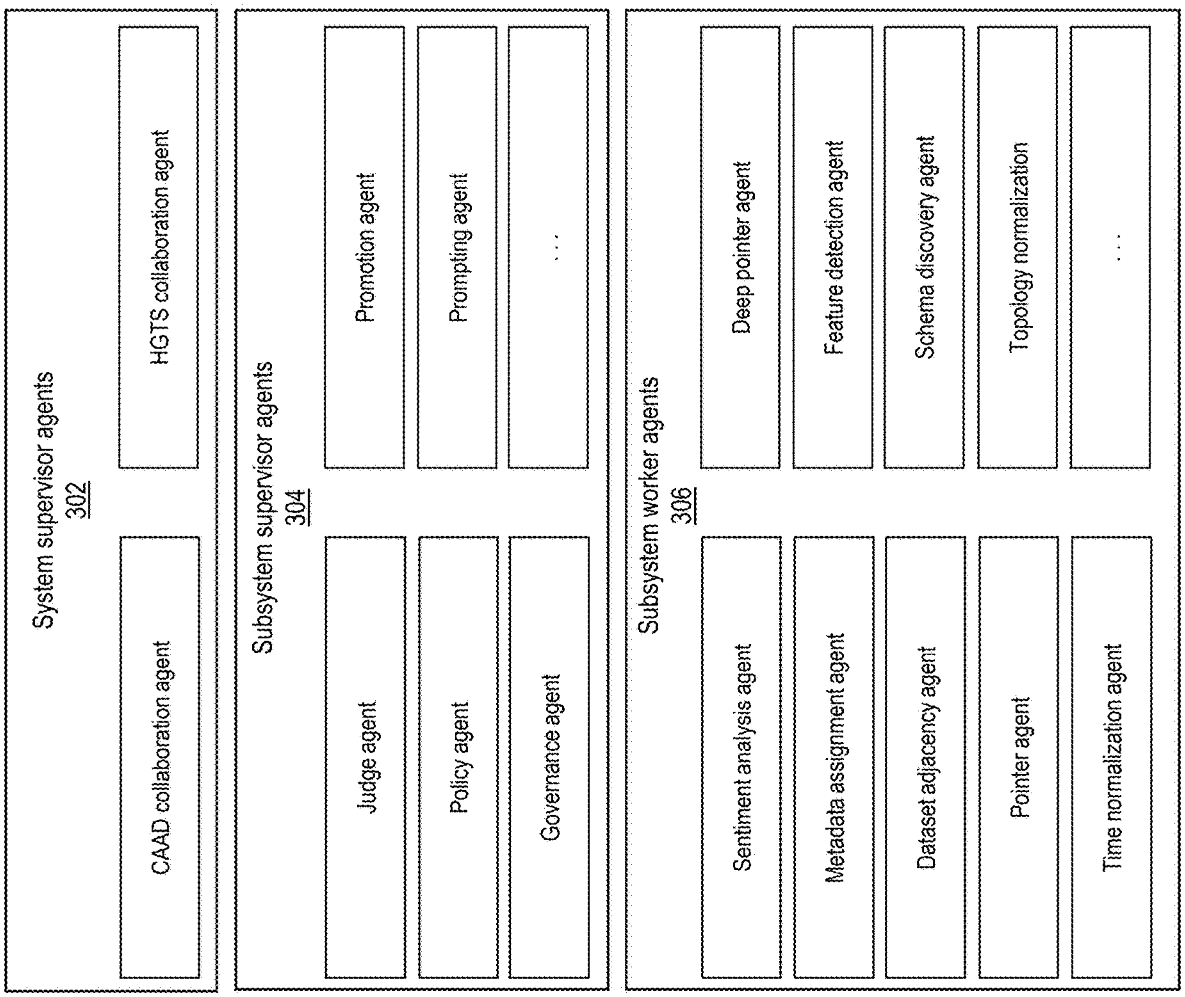
FIG. 3 is a conceptual block diagram depicting an agent hierarchy in accordance with various embodiments.

Prompting agents 153 may be configured in the form of hierarchy, such as that shown in FIG. 3, in which an agent control one or more other agents that are lower down in the hierarchy. Thus, as illustrated, a set of system supervisor agents 302 may include a CAAD collaboration agent and a HGTS collaboration agent. These agents communicate with a set of subsystem supervisor agents 304, which may include, for example, a judge agent, a policy agent, a governance agent, a total system or resource utilization or optimization agent which can be configured to optimize GPU utilization, power consumption, resource utilization, optimize cost or the like, an introspection/reflection agent which can be configured to analyze the efficacy of the iterative reasoning activities, a promotion agent, and a prompting agent. Agents can operate either independently within their hierarchy or collaboratively towards common goals or objectives and, in some embodiments, jointly contribute to a shared memory store. Shared context may include versioning, context or metadata locking, or other governance protocols to maintain consistency.

These agents 304 may in turn communicate and relay tasks to subsystem worker agents 306, such as a sentiment analysis agent, a metadata assignment agent, a dataset adjacency agent, a pointer agent, a time-normalization agent, a deep pointer agent, a feature detection agent, a schema agent, and a topology normalization agent. These worker agents 306 then interact independently or collaboratively with other components of the system illustrated in FIG. 2, such as CAAD 150 and context agents 152. In certain embodiments, multiple autonomous or semi-autonomous agents may jointly contribute to a shared context space, coordinating via agent messaging protocols, semantic embeddings, or co-authored metadata. This enables swarm-based AI cognition and team-based problem-solving across agents. Metadata agents may, in some embodiments, be assigned to look for semantic gaps in CAAD and seek out alternative correlations methods to enhance data quality as measured by correlative capabilities.

In accordance with another embodiment of the invention, the hierarchy depicted in FIG. 3 is dynamic, rather than static or immutable. There are scenarios in which an agent is be "promoted" over another depending on the application, embodiment, dynamic changes to model, and other such factors. Alternatively, multiple agents can be temporarily tasked to jointly contribute to a common set of objectives or goals supporting team-based reasoning, multi-perspective problem solving, or red-team vs blue-team type activities.

More particularly, CAAD 150 may be accessed and interfaced with using a diverse range of prompting methodologies to enable dynamic information retrieval, generation, and storage within intelligent systems. Methods of information retrieval may include, but are not limited to, vector search based retrieval via cosine or other similarity metric applied to embedding vectors as well as non-prompt based structured queries and the like. Prompting methods include, but are not limited to: (1) zero-shot prompting, wherein a model receives a direct instruction or query without prior examples; (2) few-shot prompting, which utilizes one or more input-output exemplars to condition model behavior; (3) chain-of-thought prompting, where the prompt encourages decomposition of complex reasoning tasks into sequential inferential steps; (4) task-specific instructions, which provide explicit operational objectives such as summarization, translation, classification, or content generation; (5) open-ended prompting, wherein the system is granted freedom to produce creative or exploratory responses; (6) prompt chaining, which involves a structured sequence of interdependent prompts to execute multi-step processes; and (7) role prompting, where the system is directed to assume a specific role, persona, or domain expertise to influence tone, style, or contextual alignment. Additionally, the CAAD supports context-aware prompting, in which prompts are dynamically formulated or modified based on metadata structures, contextual embeddings, or prior interaction states, enabling the model to access CAAD datasets and CAAD-trained models in a semantically coherent and context-preserving manner.

Prompting may be initiated manually by a human user (162), semi-autonomously through AI-assisted workflows, or fully autonomously via intelligent agents (153) possessing multi-modal capabilities, including but not limited to natural language, visual, auditory, and symbolic reasoning inputs and outputs. The CAAD architecture is further designed to support programmatic interfacing via a CAAD API (shown in FIG. 2), which allows HGTS 100 to both read from and write to CAAD 150—thus enabling the continuous, recursive training, contextual retrieval, and hypothesis refinement processes necessary for autonomous scientific reasoning and adaptive intelligence. CAAD augments RAG systems by introducing weighted embedding spaces and context-aware ranking layers. These structures prioritize retrieval based not only on vector similarity, but also on historical model performance, agent scoring, goal or objective alignment, and hypothesis context alignment. In some embodiments, human interfaces are provided for visualizing, annotating, or debugging context flows. This includes tools for traceability (e.g., context lineage tracking), prompt influence visualization, and override mechanisms for steering model behavior. Such interfaces support regulatory compliance and explainable AI (XAI).

Figure 4:
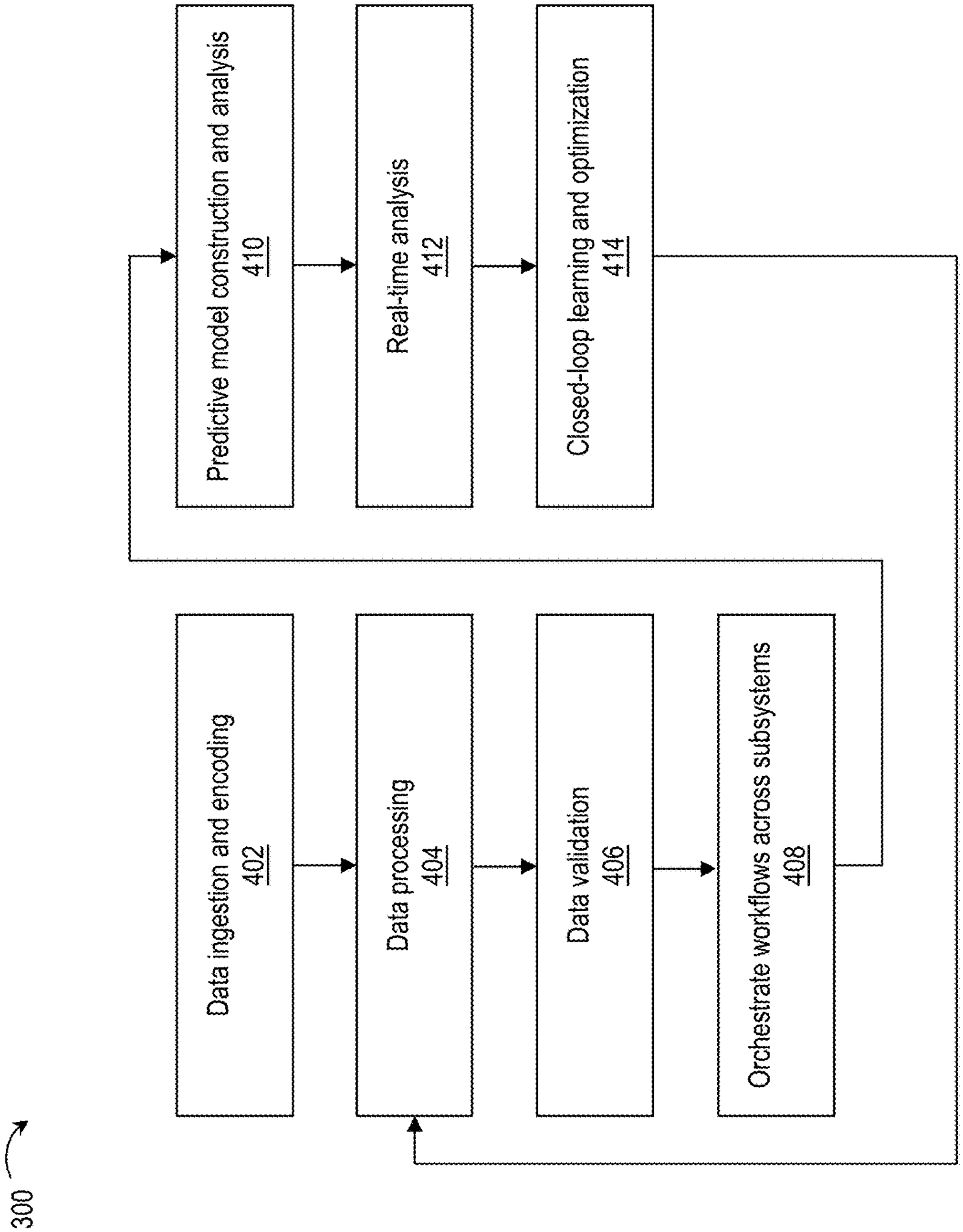
FIG. 4 is a flowchart illustrating a method in accordance with various embodiments.

FIG. 4 is a flowchart illustrating a method 300 in accordance with various embodiments. In general, utilizing the various components illustrated in FIGS. 1-3, the method involves data ingestion and encoding (step 402) (e.g., data received from data sources 140 and/or synthetic data generated by analytics engine 130 itself), followed by data processing (step 404) and data validation (step 406).

Data ingestion (step 402) involves receiving structured and/or unstructured data as described above, and data processing involves direct data processing, by applicable AI agents, to transform raw data into context-aware data. Examples of such agentic tasks include, without limitation, metadata assignment agents that tag events/entities; sentiment analysis agents to extract tone and polarity; time-normalization agents that standardize temporal data; dataset adjacency agents that connect related datasets; pointer and deep pointer agents that identify key cross-document reference, and schema discovery agents that understand new data formats.

Data validation (step 406) is performed to validate the data's context. For example, governance and policy agents can ensure compliance and coherence, prompting agents can apply any of the prompting techniques described above (e.g., as shown in FIG. 2), and scoring (judging) agents can assess confidence and risk thresholds.

Predictive model construction and analysis (step 410) includes, for example, fusing semantically enriched metadata, embedding relationships across multiple data sources, training models for context-aware prediction, using adjacent datasets (e.g., suppliers, peers), schema discovery and adjacency agents inferring likely outcomes, and recommendations using risk-adjusted scores.

Workflows are then orchestrated (step 408) across subsystems as described above using, for example, system supervisor agents 302 (working in conjunction with agents 304 and 306). A predictive model is then constructed and analyzed (step 410) via analytics engine 130. This analysis may be performed in real-time (step 412) or performed asynchronously, depending upon the application and context. Finally, context evaluation for retention, decay or other lifecycle scoring, closed loop learning, goal or objective scoring, and overall system iterative learning optimization is performed (step 414) and the process continues as necessary back to data processing step 404.

While the present invention may be deployed in any number of contexts, in the interest of presenting a practical (non-limiting) implementation of the above system, we will consider an example in the domain of financial market prediction and equities trading optimization.

First, the system receives, ingests, and encodes context-aware data streams from disparate structured and unstructured sources (step 402), including historical earnings reports, company press releases, product launch announcements, financial disclosures, macroeconomic indicators, stock price movements, trading volumes, S&P 500 index trends, insider trading data, capital raise events, share buybacks, dividend changes, and the like.

The ingestion process is orchestrated by agents 306, including for example Metadata Assignment Agents, Sentiment Analysis Agents, Time Normalization Agents, Dataset Adjacency Agents, Pointer Agents, Deep Pointer Agents, and Schema Discovery Agents. These agents operate autonomously or semi-autonomously to normalize temporal sequences, extract contextual sentiment, identify relationships among disparate documents, and generate metadata and pointer descriptors referencing specific financial events, entities, and performance metrics.

Once data is ingested and tagged, Sub-System Supervisor Agents 304 such as Governance Agents, Policy Agents, Prompting Agents, and Scoring (Judge) Agents reinforce contextual correctness, regulatory alignment, and confidence thresholds. Prompting Agents 153 then execute various types of prompting, including zero-shot prompting to extract sentiment from unstructured earnings call transcripts, few-shot prompting to condition evaluations using annotated historical precedents, chain-of-thought prompting to induce model-based reasoning across time-indexed events, task-specific prompting to calculate likely market impact, and context-aware prompting to inject deep pointer-derived metadata into predictive sequences.

System Supervisor Agents 302 such as the CAAD Collaboration Agent and HGTS Collaboration Agent orchestrate macro-level workflows by coordinating with external financial data providers, GenAI models, and predictive analytics platforms. These agents generate and test hypotheses regarding the future performance of the target stock under multiple scenario paths (e.g., above-estimate earnings, competitor losses, sector downgrades, or geopolitical shifts) and activate worker agents to simulate downstream effects. Since models stored in CAAD will contain metadata context embeddings, optimal models can be pre-selected or prioritized for iterative reasoning activities, hypotheses testing, theory selection, data cleansing or other tasks. In addition to enabling differentiated iterative reasoning performance, this feature also enables optimization of activities to either improve the speed of execution, optimize resource utilization, minimize system utilization spending and the like.

Context-aware model construction occurs within the HGTS framework by aggregating and fusing the semantically enriched metadata, which now includes historical earnings context, market movements, competitor performance, and macroeconomic context. Predictive models are trained with embeddings that capture interdependencies among earnings history, investor response, and market dynamics.

Prior to the release of a scheduled earnings report, for example, the system executes speculative analysis via adjacent-industry models using Dataset Adjacency Agents and Schema Discovery Agents. The models infer probable earnings outcomes based on supplier data, industry signals, and recent peer behavior. Based on predictive thresholds and risk-adjusted scoring from Scoring Agents, the system may recommend a short or long position, which is validated through human-in-the-loop or fully autonomous channels.

Upon release of an actual press release or earnings document, real-time agents perform instantaneous ingestion and analysis. Sentiment Analysis Agents, Feature Detection Agents, and Time Normalization Agents immediately evaluate language, tone, performance metrics, and deviation from prior expectations. The system compares the release with precomputed expectations and triggers real-time prompts for execution.

If the press release is deemed materially impactful, the CAAD system 150 initiates immediate trade actions through automated or semi-autonomous interfaces. This occurs within milliseconds during regular or after-hours trading sessions, allowing the system to act ahead of market consensus and exploit arbitrage or momentum-driven opportunities.

The combination of CAAD's hierarchical agent architecture (FIG. 3), GenAI prompting methods, predictive analytics modules, and HGTS hypothesis testing processes enables a closed-loop, self-improving trading intelligence capable of performing end-to-end decisioning from ingestion to execution. This systematic framework establishes a context-aware superintelligence capable of outperforming traditional algorithmic trading systems. At step 416, context entries are evaluated for promotion, demotion, or deletion. This decision may be based on access frequency, user validation, agent scoring, or temporal thresholds. The CAAD system thus simulates a cognitive process of memory consolidation and forgetting.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms “module” or “controller” refer to any hardware, software, firmware, electronic control component, processing logic, and/or processor device, individually or in any combination, including without limitation: application specific integrated circuits (ASICS), Geld programmable gate-arrays (FPGAs), dedicated neural network devices (e.g., GOOGLE Tensor Processing Units), quantum computing, visual or Image processing units, graphic processing units (OPUs), system on chips (SOCs), central processing units (CPUs), microcontroller units (MCUs), electronic circuits, processors (shared, dedicated, or group) configured to execute one or more software or firmware programs, a combinational logic circuit, and/or other suitable components that provide the described functionality.

As used herein, the word “exemplary” means “serving as an example, instance, or illustration.” Any implementation described herein as “exemplary” is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A context aware AI database (CAAD) system comprising:
- a CAAD core module provided within a CAAD database;
- a context store and context embedding store communicatively coupled to the CAAD core module via at least one of an application programming interface (API) and a databus; and
- a plurality of agents communicatively coupled to the at least one API and databus and configured to:
  - (a) ingest and process context information from a plurality of data sources;
  - (b) generate a plurality of metadata pointers to metadata consisting of subfeatures in a set of source datasets from which the context information is derived;
  - (c) generate a plurality of deep pointers describing a set of methods, models, weights, and procedures used to derive a set of specific metadata outputs;
  - (d) store both data-level and model-level aspects of the metadata be used for inference, reproducibility, and future training workflows;
  - (e) selectively classify the datasets as one of probation or non-probationary based on predetermined criteria.

2. The CAAD system of claim 1, wherein said agents include at least one of: a classification agent, a sentiment analysis agent, a metadata documentation agent, a training feature detection agent, a data cleansing agent, a hypothesis ideation agent, or a pointer/deep pointer agent.

3. The CAAD system of claim 2, wherein selectively classifying the datasets as one of probationary or non-probationary based predetermined criteria includes selectively storing the datasets in either a probationary or a non-probationary environment or assigned a probationary non-probationary flag and the agents are configured to perform at least one of:
- (a) selectively promoting and demoting datasets between the probationary and the non-probationary environment;
- (b) automatically classifying and labeling at least a portion of the data and metadata according to predetermined criteria including at least one of usage frequency, accuracy, task alignment, goal alignment, and relevancy decay scores; and
- (c) embedding hypotheses, derived context, event sequences, of cause/effect relationships as structured knowledge for subsequent reanalysis.

4. The CAAD system of claim 3, wherein the context embedding store includes references to the deep pointers and context-derived datasets, each referencing objects or features within source datasets for targeted reuse, training, or model evaluation.

5. The CAAD system of claim 1, wherein the plurality of agents operate in accordance with a hierarchy in which a first subset of said agents controls at least one of said agents in a second subset.

6. The CAAD system of claim 5, wherein the hierarchy is dynamic such that an agent in the second subset of agents may be promoted to the first subset and an agent in the first subset of agents may be demoted to the second subset of agents.

7. The CAAD system of claim 5, wherein the agents within the hierarchy can either work independently or be dynamically assigned to work in collaboration a) towards a common objective or goal or b) against one another in a red-team vs blue-team framework.

8. The CAAD system of claim 5, wherein the agents within the hierarchy can autonomously or semi-autonomously be assigned goals or objectives in support of iterative or recursive learning cycles.

9. The CAAD system of claim 1, wherein one or more agents are configured to autonomously or semi-autonomously define goals or objectives, monitor progress towards those goals or objectives, and iteratively refine prompts based on performance feedback.

10. The CAAD system of claim 1, further including a set of prompting agents communicatively coupled to the CAAD database via the API and databus.

11. A method for operating a context aware AI database (CAAD) system, the method comprising:
- providing a CAAD core module within a CAAD database;
- providing a context store and context embedding store communicatively coupled to the CAAD core module via at least one of an application programming interface (API) and a databus;
- providing a plurality of agents communicatively coupled to the at least one API and databus, wherein the plurality of agents are configured to:
  - (a) ingest and process context information from a plurality of data sources;
  - (b) generate a plurality of metadata pointers to metadata consisting of subfeatures in a set of source datasets from which the context information is derived;
  - (c) generate a plurality of deep pointers describing the methods, models, weights, and procedures used to derive a set of specific metadata outputs;

(d) store both data-level and model-level aspects of the metadata to be used for inference, reproducibility, and future training workflows; and (e) selectively classify the datasets as one of probationary or non-probationary based on predetermined criteria.

12. The method of claim 11, wherein said agents Include at least one of: a classification agent, a sentiment analyst metadata documentation agent, a training feature detection agent, a data cleansing agent, a hypothesis ideation agent, and a pointer/deep pointer agent.

13. The method of claim 12, wherein the step of selectively classifying the datasets as one of probationary or non-probationary based on predetermined criteria includes selectively storing the datasets in one of a probationary and a non-probationary environment and the agents are configured to perform it cast one of:

(a) selectively demoting datasets between the probationary and the non-probationary environment;

(b) automatically classifying and labeling at least a portion of the data and metadata according to predetermined criteria which may include usage frequency, recency, accuracy, task alignment, goal alignment, relevancy decay scores and the like; and (c) embedding hypotheses, derived context, event sequences, or cause/effect relationships as structured knowledge for subsequent reanalysis.

14. The method of claim 11, wherein the context embedding store includes references to the deep pointers and context-derived datasets, each referencing objects or features within larger source datasets for targeted reuse, training, or model evaluation.

15. The method of claim 11, wherein the plurality of agents operate in accordance with a hierarchy in which a first subset of said agents controls at least one of said agents in a second subset.

16. The method of claim 15, wherein the hierarchy is dynamic such that an agent in the second subset of agents may be promoted to the first subset and an agent in the first subset of agents may be demoted to the second subset of agents.

17. The method of claim 15, wherein the agents within the hierarchy can either work independently or be dynamically assigned to work in collaboration a) towards a common objective or goal or b) against one another in a red-team vs blue-team framework.

18. The method of claim 15, wherein the agents within the hierarchy can autonomously or semi-autonomously be assigned goals or objectives in support of iterative or recursive learning cycles.

19. The method of claim 15, wherein one or more agents are configured to autonomously or semi-autonomously define goals or objectives, monitor progress towards those goals or objectives, and iteratively refine prompts based on performance feedback.

20. The method of claim 11, further including a set of prompting agents communicatively coupled to the CAAD database via the API and databus.

* * * * *